United States Patent [19]

Hirth et al.

[11] Patent Number: 4,813,978

[45] Date of Patent: Mar. 21, 1989

[54] PROCESS FOR SEPARATING PARTICLES AND APPARATUS FOR CARRYING OUT THE PROCESS

[76] Inventors: Michael Hirth, Weidweg 4, 5035 Unterentfelden; Norbert Weigart, Im Eichtal 5, 5400 Baden, both of Switzerland

[21] Appl. No.: 128,272

[22] Filed: Dec. 3, 1987

[30] Foreign Application Priority Data

Dec. 10, 1986 [CH] Switzerland .......................... 4916/86

[51] Int. Cl.$^4$ .............................................. B03C 3/01
[52] U.S. Cl. ................................................ 55/5; 55/9; 55/11; 55/72; 55/97; 55/107; 55/122; 55/262; 55/264
[58] Field of Search ....................... 55/5, 9, 11, 72, 97, 55/261, 262, 264, 350, 107, 122

[56] References Cited

U.S. PATENT DOCUMENTS

| | | | |
|---|---|---|---|
| 2,002,860 | 5/1935 | Levy | 55/11 X |
| 2,608,472 | 8/1952 | Flosdorf et al. | |
| 2,675,889 | 4/1954 | Frey | 55/72 X |
| 2,771,158 | 11/1956 | Bray et al. | 55/97 |
| 2,966,232 | 12/1960 | Austin | 55/97 X |
| 3,179,497 | 4/1965 | Yanagase | 55/72 X |
| 3,395,512 | 8/1968 | Finney, Jr. et al. | 55/97 X |
| 3,485,014 | 12/1969 | Atsukawa et al. | 55/5 X |
| 3,899,308 | 8/1975 | Petersson | 55/11 X |
| 4,006,066 | 2/1977 | Sparwald | 55/11 X |
| 4,042,667 | 8/1977 | Ishiwata et al. | 55/97 X |
| 4,215,101 | 7/1980 | Kriegel et al. | 55/262 X |
| 4,375,982 | 3/1983 | Chitil | 55/11 X |
| 4,662,899 | 5/1987 | Tandon | 55/97 X |
| 4,696,679 | 9/1987 | Albulescu et al. | 55/11 X |
| 4,710,302 | 12/1987 | Pollert | 55/9 X |

FOREIGN PATENT DOCUMENTS

| | | |
|---|---|---|
| 3514471 | 10/1986 | Fed. Rep. of Germany . |
| 1140652 | 8/1957 | France . |
| 7802095 | 9/1979 | Switzerland ........................ 55/195 |
| 1110649 | 4/1968 | United Kingdom . |

OTHER PUBLICATIONS

"Anreicherung von Thallium-und Bleihalogeniden . . .", Staub Reinhaltung der Luft, Band 46 (1986), Nr. 3-Marz.

Primary Examiner—Robert Spitzer

[57] ABSTRACT

In the separation of particles, these are heated together with a gaseous carrier medium. Constitutents of these particles thus vaporize, are cooled in a cooler (21) and condense out. An apparatus for carrying out this process comprises a fan (1) and a heating device (7). A continuous process can be used on a large industrial scale. This is achieved when the particles and the carrier medium are mixed continuously and at controlled rates to give a fluidized blend. This blend is heated to a given temperature in a fluidized bed of a heating device (7), with the production of a mixture consisting of a vapor/gas mixture thus formed and of particle constitutents remaining in the form of particles. After the mixture has left the heating device (7), the particle constitutents remaining in the form of particles are precipitated and a vapor/gas mixture is passed forward in at least one closed circulation.

14 Claims, 2 Drawing Sheets

PROCESS FOR SEPARATING PARTICLES AND APPARATUS FOR CARRYING OUT THE PROCESS

FIELD OF THE INVENTION

The invention starts from a process for separating particles and from an apparatus for carrying out the process. In particular, it relates to a process for separating particles which contain at least one first substance vaporizable below a given temperature and at least one second substance remaining in the form of particles above the given temperature, the particles being heated together with a flowing gaseous carrier medium to the given temperature, the vaporizing first substance, of which there is at least one, and the gaseous carrier medium forming a vapor/gas mixture which is then at least partially cooled until the first substance, of which there is at least one, condenses. In particular, the invention also relates to an apparatus for carrying out this process, having a fan and, downstream thereof, a heating device operatively connected to a cooler.

BACKGROUND OF THE INVENTION

From the journal "Staub, Reinhaltung der Luft", Volume 46 (1986), pages 120 to 124, a discontinuously operating process for the separation of particles is known. In this process, individual samples of particles, for example electrostatic filter dusts with absorbed heavy metal compounds, are heated together with a flowing gaseous carrier medium to comparatively high temperatures. Constituents of these particles, especially the heavy metal compounds, vaporize and form a vapor/gas mixture with the carrier medium. This vapor/gas mixture is then cooled until the vaporized constituents condense. The condensate can be used for analytical purposes. The apparatus used for this separation consists of a fan which moves the carrier medium over the particles introduced batchwise into the heating device. The vapor/gas mixture formed in the heating device is cooled in a downstream cooler.

The process described above and the apparatus for carrying it out are only suitable for laboratory operation in order to obtain very small quantities of condensate for analysis. Moreover, the time and energy expended on this process are comparatively high, so that large-scale industrial application of the process would be uneconomical.

SUMMARY OF THE INVENTION

The invention is intended to remedy this situation. The invention as defined in the claims achieves the object of indicating a continuous process for separating particles, which process can be employed on a large industrial scale, and of providing an apparatus for carrying out the process, allowing economically advantageous, continuous operation.

The advantages achieved by the invention are to be seen essentially in the fact that relatively large quantities of particles, for example filter dusts laden with pollutants, can be processed continuously and freed of these pollutants. The pollutants are collected and reprocessed or stored in special waste depositories, whereas substances which remain in the form of particles, for example the filter dusts purified by the removal of pollutants, and which then no longer cause a hazard to the environment, can be disposed of in ordinary dumps or used as building material.

The further embodiments of the invention are subjects of the dependent claims.

The invention, its further development and the advantages achievable by the invention are explained in more detail below by reference to the drawings which represent merely one illustrative embodiment.

BRIEF DESCRIPTION OF THE DRAWINGS

In the drawings.

In all the figures, elements having the same action are provided with the same reference symbols.

DETAILED DESCRIPTION OF A PREFERRED EMBODIMENT

Figure 1:
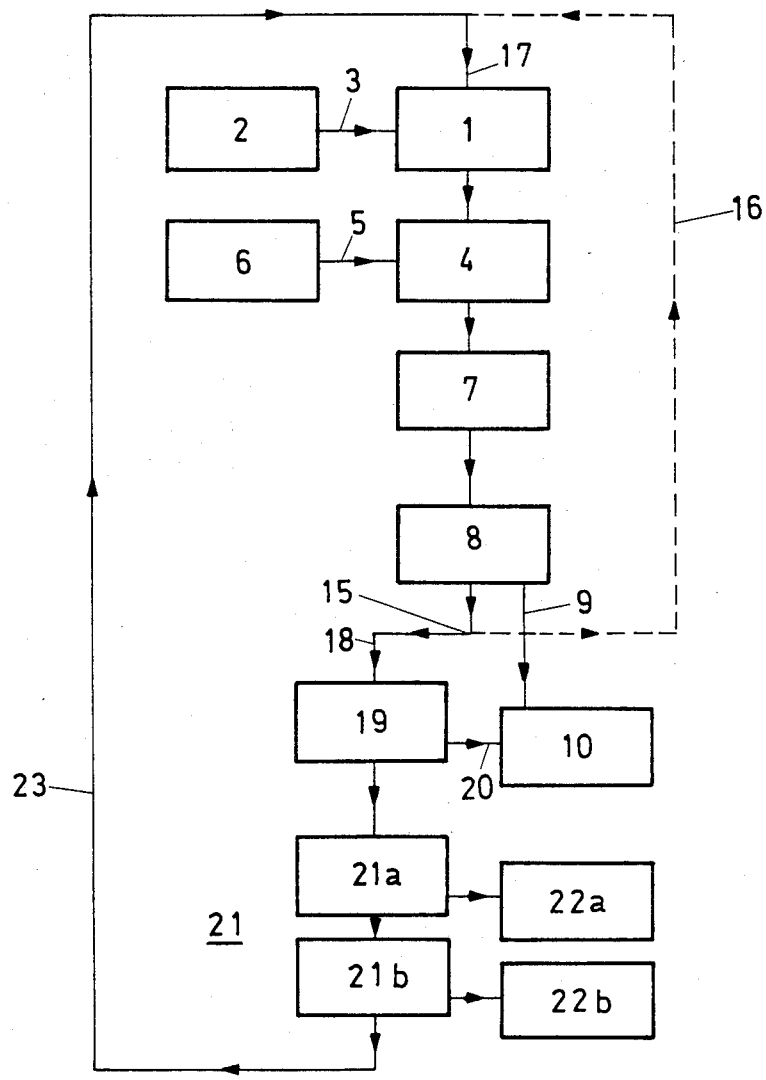
FIG. 1 is a block diagram of the process according to the invention.

The block diagram in FIG. 1 shows the interaction of the various components important for the process. A fan 1 maintains the flow of a gaseous carrier medium. Any losses of carrier medium can be replaced from a reservoir vessel 2 via a connection 3. The stream of carrier medium passes from the fan 1 into a mixer 4 which is constructed, for example, as a rotary mixer or high-speed mixer. The outflow 5 from a charging bunker 6, which is filled with particles, is also introduced into this mixer 4. In the mixer 4, the particles are mixed continuously and at controlled rates with the flowing gaseous carrier medium to give a fluidized blend, which flows into a heating device 7. In this heating device 7, constituents of the particles vaporize and, together with the heated carrier medium, form a vapor/gas mixture. This vapor/gas mixture leaves the heating device 7 as a mixture, together with the particle constituents remaining in the form of particles. The mixture is passed into a dust precipitator 8, wherein the predominant quantity of the particle constituents remaining in the form of particles is precipitated and passed through a line 9 into a dust silo 10. The vapor/gas mixture leaving the dust precipitator 8 and containing a small proportion of residues of the particle constituents remaining in the form of particles is passed to a branch 15. At this branch 15, a first part of this vapor/gas mixture is branched off and recycled as a circulating stream through a line 16 to an intake 17 of the fan 1. A second part of this vapor/gas mixture is passed through the line 18 into a hot-gas filter 19 and is freed therein from residues of the constituents which have remained in the form of particles. The precipitated residues of the constituents which have remained in the form of particles are introduced through a line 20 into the dust silo 10. Downstream of the hot-gas filter 19, the vapor/gas mixture is introduced into a cooler 21 which can have several stages 21a, 21b with different cooling temperature levels. The vaporized constituents of the particles condense according to their specific condensation temperatures in the particular stages 21a, 21b of the cooler and are collected in associated receivers 22a, 22b. The cooled carrier medium leaves the cooler 21 and is recycled through a line 23 to the intake 17 of the fan 1.

In this block diagram according to FIG. 1, the line 16 for the circulating stream can also be omitted or isolated, if the composition of the particles allows this.

Figure 2:
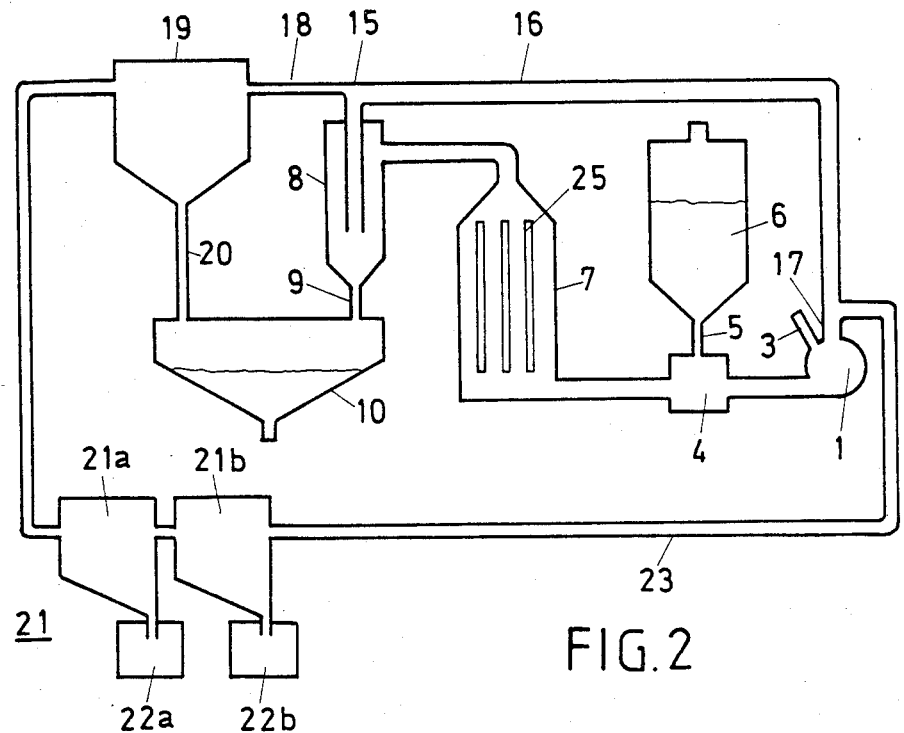
FIG. 2 is a first diagrammatic illustration of an apparatus according to the invention and FIG. 3 is a second diagrammatic illustration of an apparatus according to the invention.

FIG. 2 shows the apparatus which operates in accordance with the block diagram in FIG. 1. Controlling, regulating and metering instruments, sensors, charging devices, discharge devices and shut-off devices etc., which must necessarily be present, are here not drawn in this diagrammatic illustration. Moreover, heat insulations, which enclose the entire apparatus with the exception of the cooler 21, have also been omitted. The connection 3 to the reservoir vessel is only indicated. In the heating device 7, heater elements 25 are indicated which heat up the fluidized blend. The heater elements 25 can be heated electrically or, for example, advantageously also by process heat such as arises in a refuse incinerator, in power stations or in cement works. The heating temperature can be selected from a few 100° C. up to the range of about 1,200° C. and can be adapted to those constituents of the particles which are to be vaporized. It is also conceivable to use a plasma burner as the heat source. The heating device 7 is constructed such that the fluidized blend forms a fluidized bed therein. This has the result that this blend flows through the heating device 7 in a controlled manner, so that all the particles are also heated uniformly. The mean residence time of the particles in the fluidized bed zone can be adapted to the particular chemical composition of the particles.

The dust precipitator 8 is advantageously designed as a single-stage or multi-stage cyclone. There must be no temperature gradient arising between the heating device 7, the dust precipitator 8 and the hot-gas filter 19, in order to ensure that the vaporized constituents cannot be readsorbed on the constituents which have remained in the form of particles. Downstream of this dust precipitator 8, as a rule the predominant part of the vapor/gas mixture formed in the heating device 7 is recycled as a circulating stream at the branch 15 through the line 16 to the fan 1 and, at the latter, is fed again as the carrier medium into the circulation. The remaining part of the vapor/gas mixture is passed through the line 18 into a hot-gas filter 19 which can be designed, for example, as an electrostatic filter or as a ceramic honeycomb filter. In this hot-gas filter 19, the residues of the constituents, which have remained in the form of particles, are removed from the remaining part of the vapor/gas mixture. This vapor/gas mixture is then introduced into the cooler 21 and cooled in several stages 21a, 21b. The levels of the cooling temperature are selected such that one defined fraction of the vapor/gas mixture condenses at each level and is discharged as a liquid into the respective receiver 22a, 22b. Depending on the composition of the vapor/gas mixture, different cooling temperature levels can also be set. The cooler 21 cools the vapor/gas mixture to such an extent that all relevant vaporized constituents of the particles are condensed and removed. The vapor/gas mixture or carrier medium, which leaves the cooler 21 and still has a residual heat content, is recycled to the fan 1 and, at the latter, fed again into the circulation.

If only slight traces of, for example, a heavy metal should be present, these closed circulations prove to be particularly advantageous, since the respective heavy metal can be enriched in these circulations until it becomes possible to condense it.

Figure 3:
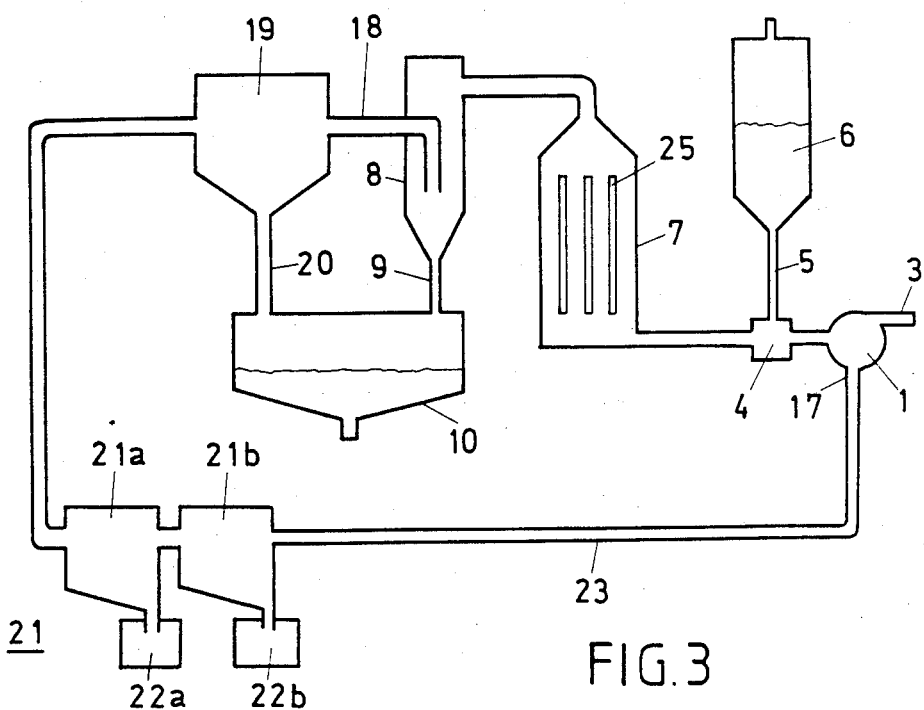

In FIG. 3, an apparatus is shown wherein, after the predominant quantity of the particle constituents which have remained in the form of particles has been precipitated, the entire vapor/gas mixture is freed of residues of the particle constituents which have remained in the form of particles, and is then cooled as a whole. This apparatus results from the block diagram according to FIG. 1 if the line 16 for the circulating stream is omitted. All the other elements function in the same way as in the apparatus according to FIG. 2, but the hot-gas filter 19 and the cooler 21 must here have larger dimensions or be designed for a higher output, if the apparatus is charged with the same quantities of particles. It is to be regarded as the advantage of this apparatus that particles of low contamination level can be purified rapidly and in large quantities.

Depending on the composition of the particles to be processed, it may be expedient to maintain the gaseous carrier medium under normal pressure, elevated pressure or reduced pressure and thus to cause the complete apparatus at the same time to operate under the most advantageous pressure conditions in each case. This of course requires appropriate constructional provisions such as, for example, pressure-tight locks at the outlet 5 of the charging bunker 6, at the outlet of the dust silo 10 and at the outlets of the individual stages 21a, 21b of the cooler 21. Moreover, the entire apparatus must be designed appropriately to withstand pressure. However, it is also conceivable to operate only the cooler 21 under an elevated pressure, in order to enable a condensation step to proceed.

The gaseous carrier medium can, matched to the particles to be processed, contain an oxidizing gas or a reducing gas or a gas mixture, and it can also consist of an inert gas or gas mixture. If an oxidizing or reducing gas is used, provision is advantageously made in the line 23 for regenerating the oxidizing or reducing gas. If the apparatus corresponding to FIG. 2 is used, such a regeneration facility may also be provided in the line 16, if required.

In the case of special compositions of the particles, it is also conceivable to build a gas wash into the line 23, in order to prevent enrichment of noncondensing pollutants in the apparatus. For example, the line 23 can also be taken through the gas wash installation which as a rule is provided downstream of a refuse incinerator. It is likewise possible to pass the vapor/gas mixture in the line 23 into the firing chamber of the refuse incinerator, in order to render the pollutants harmless in the latter.

The feasibility of the process described was confirmed by experiments. In these, dust from the filter system of a refuse incinerator with, inter alia, a cadmium content of 0.2% and a lead content of 3.25% was mixed with nitrogen as the carrier medium in the mixer 4 to give a fluidized blend. The nitrogen stream was set to 0.5 m$^3$/h, and the dust concentration was set to a rate of 40 g/m$^3$. The fluidized blend was passed through an electrically heated heating device 7 and heated in the latter to 1,000° C. The residence time of the blend in this heating device 7 was about six seconds. Downstream of the dust precipitator 8 in the hot-gas filter 19, liquid residues were found in the cooler 21. The purified dust taken out of the dust precipitator 8 and the hot-gas filter 19 did not show any detectable quantities of cadmium, and the lead content was less than 0.05%.

The above illustrative example clearly shows that the filter dusts arising in a refuse incinerator can be freed of attached harmful heavy metals and then stored without problems in dumps or utilized for building purposes. The volume of waste, which has to be stored in special waste depositories or has to be rendered harmless in other ways, from such a unit can thus be substantially reduced, which entails large economic and ecological advantages. It is also conceivable, however, to reduce pre-dried sewage sludge or similar wastes to powder and to purify the latter by removal of pollutants by means of the process according to the invention. At the temperatures used, any organic pollutants present are also rendered harmless, and this also has an advantageous effect.

What is claimed is:

1. A process for separating particles which contain at least one first substance vaporizable below a given temperature and at least one second substance remaining in the form of particles above the given temperature, the particles being heated together with a flowing gaseous carrier medium to the given temperature, the vaporizing first substance, of which there is at least one, and the gaseous carrier medium forming a vapor/gas mixture which is then at least partially cooled until the first substance, of which there is at least one, condenses, which comprises the steps of:

mixing the particles and the gaseous carrier medium continuously and at controlled rates to give a fluidized blend, heating the fluidized blend in a fluidized bed of a heating device to the given temperature, with the production of a mixture of the vapor/gas mixture and the second substance, of which there is at least one, remaining in the form of particles, immediately after the mixture has left the heating device, separating a predominant quantity of the second substance, of which there is at least one, remaining in the form of particles, and then passing the vapor/gas mixture forward in at least one closed circulation through at least one cooler, the remaining carrier medium leaving the cooler and being recycled to the beginning of the process.

2. A process as claimed in claim 1, wherein,
   after the predominant quantity of the second substance, of which there is at least one, remaining in the form of particles has been separated, a first part of the vapor/gas mixture is branched off as a circulating stream which is recycled and admixed to the carrier medium,
   a remaining second part of the vapor/gas mixture is freed of residues of the second substance, of which there is at least one, remaining in the form of particles and is then cooled in stages, and
   the cooled second part of the vapor/gas mixture is then recycled and admixed to the carrier medium.

3. A process as claimed in claim 2, wherein the cooled second part of the vapor/gas mixture is passed through a gas wash before it is recycled to the beginning of the process.

4. A process as claimed in claim 1, wherein,
   after the predominant part of the second substance, of which there is at least one, remaining in the form of particles has been separated, the total vapor/gas mixture is freed of residues of the second substance, of which there is at least one, and is then cooled in stages, and
   the cooled vapor/gas mixture is recycled and admixed to the carrier medium.

5. A process as claimed in claim 1, wherein
   the gaseous carrier medium is under normal pressure, and
   the vapor/gas mixture is also under normal pressure.

6. A process as claimed in claim 1, wherein
   at least one oxidizing gas is added to the gaseous carrier medium, and
   the at least one oxidizing gas is regenerated each time in the cooled vapor/gas mixture.

7. A process as claimed in claim 1, wherein
   the gaseous carrier medium is under elevated pressure, and
   the vapor/gas mixture is also under elevated pressure.

8. A process as claimed in claim 1, wherein
   the gaseous carrier medium is under reduced pressure, and
   the vapor/gas mixture is also under reduced pressure.

9. A process as claimed in claim 1, wherein
   at least one reducing gas is added to the gaseous carrier medium, and
   the at least one reducing gas is regenerated each time in the cooled vapor/gas mixture.

10. A process as claimed in claim 1, wherein
    at least one inert gas is added to the gaseous carrier medium.

11. An apparatus for carrying out a process for separating particles which contain at least one first substance vaporizable below a given temperature and at least one second substance remaining in the form of particles above the given temperature, the particles being heated together with a flowing gaseous carrier medium to the given temperature, the vaporizing first substance, of which there is at least one, and the gaseous carrier medium forming a vapor/gas mixture which is then at least partially cooled until the first substance, of which there is at least one, condenses, the apparatus comprising:

a fan and, downstream thereof, a heating device with an interior operatively connected to a cooler, wherein a mixer for continuous mixing at a controlled rate of particles with a gaseous carrier medium is provided between the fan and the heating device, a dust precipitator having at least one stage is provided immediately downstream of the heating device, and the apparatus is designed as a closed system.

12. An apparatus as claimed in claim 11, wherein
    the interior of the heating device is of such a design that the formation of a fluidized bed is promoted, and
    means are provided for adapting the heating temperature of the fluidized bed and also the mean residence time of the particular blend, which is to be heated, in the fluidized bed to the particular blend.

13. An apparatus as claimed in claim 12, wherein
    the outlet of the dust precipitator, having at least one stage, is constructed as a branch,
    at least two lines start from said branch,
    a first line of which there are at least two being connected to a hot-gas filter, and
    the cooler of stagewise design being provided downstream of the hot-gas filter and having an outlet which is operatively connected via a further line to the fan.

14. An apparatus as claimed in claim 12, wherein
    at least one hot-gas filter is provided immediately downstream of the outlet of the dust precipitator having at least one stage, and
    the cooler of stagewise design is provided downstream of the hot-gas filter, of which there is at least one, and has an outlet which is operatively connected via a further line to the fan.

* * * * *

UNITED STATES PATENT AND TRADEMARK OFFICE
CERTIFICATE OF CORRECTION

PATENT NO. : 4,813,978
DATED     : March 21, 1989
INVENTOR(S) : Michael Hirth, et al.

It is certified that error appears in the above-identified patent and that said Letters Patent is hereby corrected as shown below:

On the title page, insert
--[73]  Assignee:  BBC Brown Boveri AG, Baden, Switzerland--.

Signed and Sealed this

Twenty-eighth Day of November 1989

*Attest:*

JEFFREY M. SAMUELS

*Attesting Officer*    *Acting Commissioner of Patents and Trademarks*